United States Patent
Ahmadian et al.

(10) Patent No.: US 10,815,817 B2
(45) Date of Patent: Oct. 27, 2020

(54) HEAT FLUX MEASUREMENT SYSTEM

(71) Applicant: United Technologies Corporation, Hartford, CT (US)

(72) Inventors: Shayan Ahmadian, Vernon, CT (US); Charles W. Haldeman, Simsbury, CT (US); Mark F. Zelesky, Bolton, CT (US); Christopher T. Bergman, Wethersfield, CT (US); Sebastian Martinez, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1081 days.

(21) Appl. No.: 15/002,724

(22) Filed: Jan. 21, 2016

(65) Prior Publication Data

US 2017/0211408 A1     Jul. 27, 2017

(51) Int. Cl.
*F01D 17/08*     (2006.01)
*G01K 17/20*     (2006.01)
(Continued)

(52) U.S. Cl.
CPC .............. *F01D 17/085* (2013.01); *F02C 7/18* (2013.01); *G01J 5/0088* (2013.01); *G01J 5/10* (2013.01);
(Continued)

(58) Field of Classification Search
CPC .. F01D 17/085; F01D 5/288; F01D 5/18–189; F01D 21/003; F01D 21/12;
(Continued)

(56) References Cited

U.S. PATENT DOCUMENTS 2,906,494 A * 9/1959 McCarty ................. F01D 5/18
                                                    137/468
4,227,369 A * 10/1980 Williams ................ F23N 5/082
                                                    60/734
(Continued)

FOREIGN PATENT DOCUMENTS

EP     1494020      1/2005
EP     2082202      9/2014
(Continued)

OTHER PUBLICATIONS

Extended European Search Report for European Patent Application No. 17152499.4 completed May 10, 2017.

*Primary Examiner* — Alain Chau
(74) *Attorney, Agent, or Firm* — Carlson, Gaskey & Olds, P.C.

(57) ABSTRACT

A turbine section according to an example of the present disclosure includes, among other things, a component including a coating on a substrate, and at least one sensor positioned a distance from the component, the at least one sensor configured to detect radiation emitted from at least one localized region of the coating at a first wavelength and configured to detect radiation emitted from the substrate corresponding to the at least one localized region at a second, different wavelength. The first wavelength and the second wavelength are utilized to determine a heat flux relating to the at least one localized region. A method of measuring a gas turbine engine component is also disclosed.

17 Claims, 5 Drawing Sheets

(51) Int. Cl.
  *G01N 25/20* (2006.01)
  *F02C 7/18* (2006.01)
  *G01J 5/00* (2006.01)
  *G01J 5/10* (2006.01)
  *G01N 21/84* (2006.01)
  *G01N 21/88* (2006.01)

(52) U.S. Cl.
  CPC ............ *G01K 17/20* (2013.01); *G01N 25/20* (2013.01); *F05D 2300/611* (2013.01); *G01N 2021/8427* (2013.01); *G01N 2021/8864* (2013.01)

(58) Field of Classification Search
  CPC .......... G01J 5/0088; G01J 5/0022; G01J 5/10; G01J 17/20; G01J 2021/8427; G01J 2021/8864; F02C 7/18; F02C 9/28; F05D 2230/90; G01N 2021/8427; G01N 2021/8864; G01N 21/00; G01N 25/20; G01M 15/14
  See application file for complete search history.

(56) References Cited

U.S. PATENT DOCUMENTS

| | | | | |
|---|---|---|---|---|
| 4,326,798 A * | 4/1982 | Kahn | ........................ | G01J 5/60 356/43 |
| 4,582,426 A * | 4/1986 | Douglas | ................ | F01D 17/085 356/43 |
| 4,722,609 A * | 2/1988 | Epstein | .................. | G01K 17/20 250/252.1 |
| 4,764,025 A * | 8/1988 | Jensen | .................. | G01J 5/0088 356/45 |
| 4,812,050 A * | 3/1989 | Epstein | .................. | G01K 17/20 250/252.1 |
| 5,005,984 A * | 4/1991 | Noel | ....................... | G01K 1/143 374/29 |
| 5,026,170 A * | 6/1991 | Noel | ....................... | G01K 1/143 374/29 |
| 5,044,765 A * | 9/1991 | Noel | ....................... | G01K 1/143 374/29 |
| 5,253,976 A * | 10/1993 | Cunha | .................... | F01D 5/182 415/114 |
| 5,273,359 A * | 12/1993 | Noel | ....................... | G01K 17/20 374/29 |
| 5,608,515 A | 3/1997 | Shu et al. | | |
| 6,422,743 B1 * | 7/2002 | Nirmalan | ............. | G01J 5/0088 250/330 |
| 6,427,448 B1 * | 8/2002 | Reichert | ................ | F01D 5/081 415/115 |
| 6,796,709 B2 * | 9/2004 | Choi | .................... | G01J 5/0022 374/102 |
| 6,804,622 B2 * | 10/2004 | Bunker | .................. | G01K 11/30 374/43 |
| 7,572,524 B2 * | 8/2009 | Sabol | ...................... | F01D 17/02 428/701 |
| 7,618,712 B2 * | 11/2009 | Sabol | ........................ | C23C 4/18 428/469 |
| 7,690,840 B2 | 4/2010 | Zombo et al. | | |
| 8,490,474 B2 * | 7/2013 | Krishna | .................. | F23N 5/242 73/112.01 |
| 8,759,770 B1 | 6/2014 | Woods et al. | | |
| 8,768,646 B2 | 7/2014 | Key | | |
| 9,151,698 B2 | 10/2015 | Jahnke et al. | | |
| 2004/0179575 A1 * | 9/2004 | Markham | ............. | G01J 5/0022 374/121 |
| 2005/0198967 A1 * | 9/2005 | Subramanian | ........... | C23C 4/18 60/803 |
| 2005/0287386 A1 * | 12/2005 | Sabol | ..................... | G01H 1/006 428/543 |
| 2006/0056960 A1 * | 3/2006 | Sabol | ........................ | C23C 4/18 415/118 |
| 2008/0053234 A1 * | 3/2008 | Staroselsky | ............ | G01N 25/72 73/649 |
| 2008/0101683 A1 * | 5/2008 | Zombo | .................. | G01N 25/72 382/141 |
| 2008/0166489 A1 * | 7/2008 | Strock | ....................... | C23C 4/12 427/421.1 |
| 2009/0285259 A1 * | 11/2009 | Allen | .................... | G01J 5/0088 374/130 |
| 2009/0312956 A1 * | 12/2009 | Zombo | ................. | G01J 5/0022 702/34 |
| 2010/0292906 A1 * | 11/2010 | Girouard | ................. | F01D 21/12 701/100 |
| 2011/0043820 A1 | 2/2011 | Sansom et al. | | |
| 2011/0128989 A1 * | 6/2011 | Li | ............................ | G01J 3/28 374/131 |
| 2012/0167664 A1 * | 7/2012 | Krishna | ................. | F23M 11/04 73/23.31 |
| 2013/0077649 A1 | 3/2013 | Mistral | | |
| 2014/0063227 A1 | 3/2014 | Baleine | | |
| 2014/0376588 A1 * | 12/2014 | Wang | .................... | G01J 5/0088 374/121 |
| 2014/0376589 A1 | 12/2014 | Karp et al. | | |
| 2015/0176502 A1 | 6/2015 | Slavens, Jr. et al. | | |

FOREIGN PATENT DOCUMENTS

| | | |
|---|---|---|
| FR | 2365108 | 4/1978 |
| JP | H11264772 | 9/1999 |
| JP | 2014-202476 | 10/2014 |
| WO | 0146660 | 6/2001 |
| WO | 2011094658 | 8/2011 |
| WO | 2015108858 | 7/2015 |

\* cited by examiner

HEAT FLUX MEASUREMENT SYSTEM

BACKGROUND

This disclosure relates to a gas turbine engine, and more particularly to measurement of heat flux for engine components.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

A typical turbine section includes at least one array of turbine blades and at least one array of turbine vanes arranged circumferentially about an engine central longitudinal axis. Some turbine blades and vanes are provided with a thermal barrier coating (TBC) to reduce thermal exposure to the hot combustion gases.

SUMMARY

A turbine section according to an example of the present disclosure includes a component including a coating on a substrate, and at least one sensor positioned a distance from the component, the at least one sensor configured to detect radiation emitted from at least one localized region of the coating at a first wavelength and configured to detect radiation emitted from the substrate corresponding to the at least one localized region at a second, different wavelength. The first wavelength and the second wavelength are utilized to determine a heat flux relating to the at least one localized region.

In a further embodiment of any of the foregoing embodiments, a controller is electrically coupled to the at least one sensor, the controller configured to determine an instantaneous value of the heat flux based upon a comparison of the first wavelength and the second wavelength.

In a further embodiment of any of the foregoing embodiments, the at least one localized region includes a first localized region and a second, different localized region, and the controller is configured to determine a spatial gradient based upon the instantaneous value of the heat flux at the first localized region and an instantaneous value of heat flux at the second localized region.

In a further embodiment of any of the foregoing embodiments, the at least one sensor is configured to detect radiation emitted from the at least one localized region at a third wavelength different from the first wavelength and the second wavelength, and the controller is configured to determine a location of the at least one localized region relative to the component based upon the third wavelength.

In a further embodiment of any of the foregoing embodiments, the at least one sensor is at least one infrared sensor configured to detect the first wavelength in a first electromagnetic radiation frequency range that is greater than about 8 microns, and is configured to detect the second wavelength in a second electromagnetic radiation frequency range that is less than or equal to about 8 microns.

In a further embodiment of any of the foregoing embodiments, the at least one infrared sensor is a first infrared sensor and a second infrared sensor, the first infrared sensor configured to detect the first wavelength, and the second infrared sensor configured to detect the second wavelength.

In a further embodiment of any of the foregoing embodiments, the first electromagnetic radiation frequency range is greater than or equal to about 1.0 microns.

In a further embodiment of any of the foregoing embodiments, the first electromagnetic radiation frequency range is greater than or equal to about 5 microns.

In a further embodiment of any of the foregoing embodiments, the component is one of a turbine blade, a turbine vane, and a blade outer air seal (BOAS).

In a further embodiment of any of the foregoing embodiments, the coating is a thermal barrier coating, the thermal barrier coating being substantially opaque to the first wavelength at an operating condition of the turbine section and being substantially transparent to the second wavelength at the operating condition.

A gas turbine engine according to an example of the present disclosure includes a combustor section including a plurality of combustor panels arranged circumferentially about an engine axis to define a combustion chamber, a turbine section including a plurality of turbine blades and a plurality of stator vanes arranged circumferentially about the engine axis, the plurality of turbine blades adjacent to a plurality of blade outer air seals, and a heat flux measurement system. The heat flux measurement system includes at least one sensor positioned a distance from at least one component, the at least one component including a coating on a substrate, the at least one sensor configured to detect radiation emitted from at least one localized region of the coating at a first wavelength and configured to detect radiation emitted from the substrate corresponding to the at least one localized region at a second, different wavelength, wherein the first wavelength and the second wavelength are utilized to determine a heat flux relating to the at least one localized region, and wherein the at least one component is at least one of the plurality of combustor panels, the plurality of turbine blades, the plurality of stator vanes, and the plurality of blade outer air seals.

In a further embodiment of any of the foregoing embodiments, a controller is electrically coupled to the at least one sensor, the controller configured to determine the heat flux based upon a comparison of the first wavelength and the second wavelength.

In a further embodiment of any of the foregoing embodiments, the at least one component is coupled to a cooling source, and the controller is configured to cause cooling airflow between the cooling source and the at least one component to vary in response to the heat flux meeting at least one predetermined criterion.

In a further embodiment of any of the foregoing embodiments, the controller is coupled to a valve, the valve being operable to vary cooling airflow between the cooling source and the at least one component in response to the heat flux meeting the at least one predetermined criterion.

In a further embodiment of any of the foregoing embodiments, the controller is configured to cause a schedule of the engine to vary in response to the heat flux meeting at least one predetermined criterion.

In a further embodiment of any of the foregoing embodiments, the at least one sensor is at least one infrared sensor configured to detect the first wavelength in a first electromagnetic radiation frequency range that is greater than about 8 microns, and is configured to detect the second wavelength in a second electromagnetic radiation frequency range that between about 3 microns and about 8 microns.

A method of measuring a gas turbine engine component according to an example of the present disclosure includes providing at least one component including a coating on a substrate, detecting infrared radiation emitted from at least one localized region of the coating at a first wavelength, detecting infrared radiation emitted from the substrate corresponding to the at least one localized region at a second, different wavelength, determining a heat flux relating to the at least one localized region based upon a comparison of the first wavelength and the second wavelength.

In a further embodiment of any of the foregoing embodiments, the method includes detecting infrared radiation emitted from the at least one localized region at a third, different wavelength, and determining a location of the at least one localized region based upon the third wavelength.

In a further embodiment of any of the foregoing embodiments, the method includes causing at least one operating condition of the engine to vary in response to the heat flux meeting at least one predetermined criterion.

In a further embodiment of any of the foregoing embodiments, the at least one component is at least one of a combustor panel, an airfoil, and a blade outer air seal.

These and other features disclosed herein can be best understood from the following specification and drawings, the following of which is a brief description.

DETAILED DESCRIPTION

Figure 1:
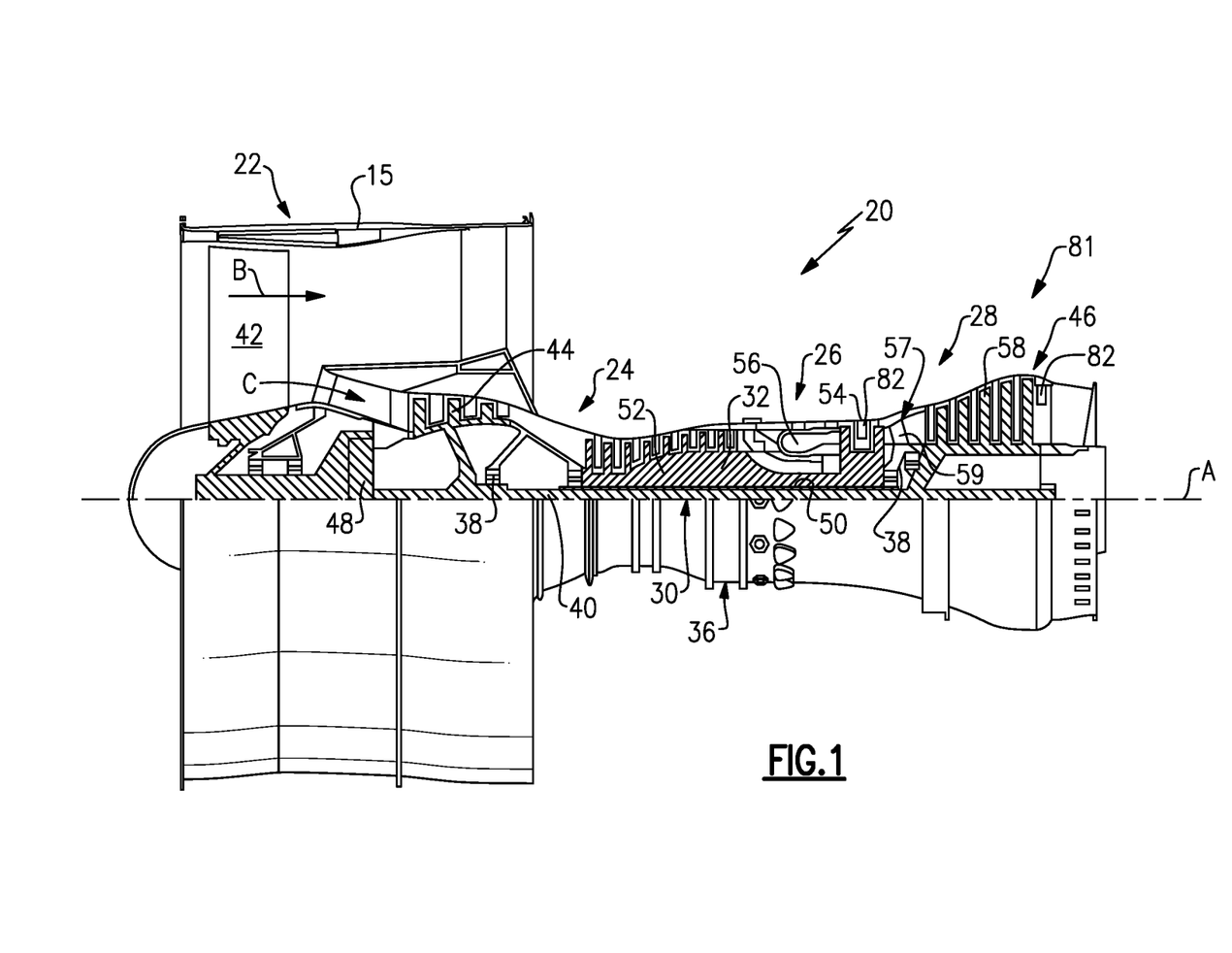
FIG. 1 illustrates an example turbine engine, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° \text{R})/(518.7° \text{R})]^{0.5}$. The "Low corrected fan tip speed" as disclosed herein according to one non-limiting embodiment is less than about 1150 ft/second.

Figure 2:
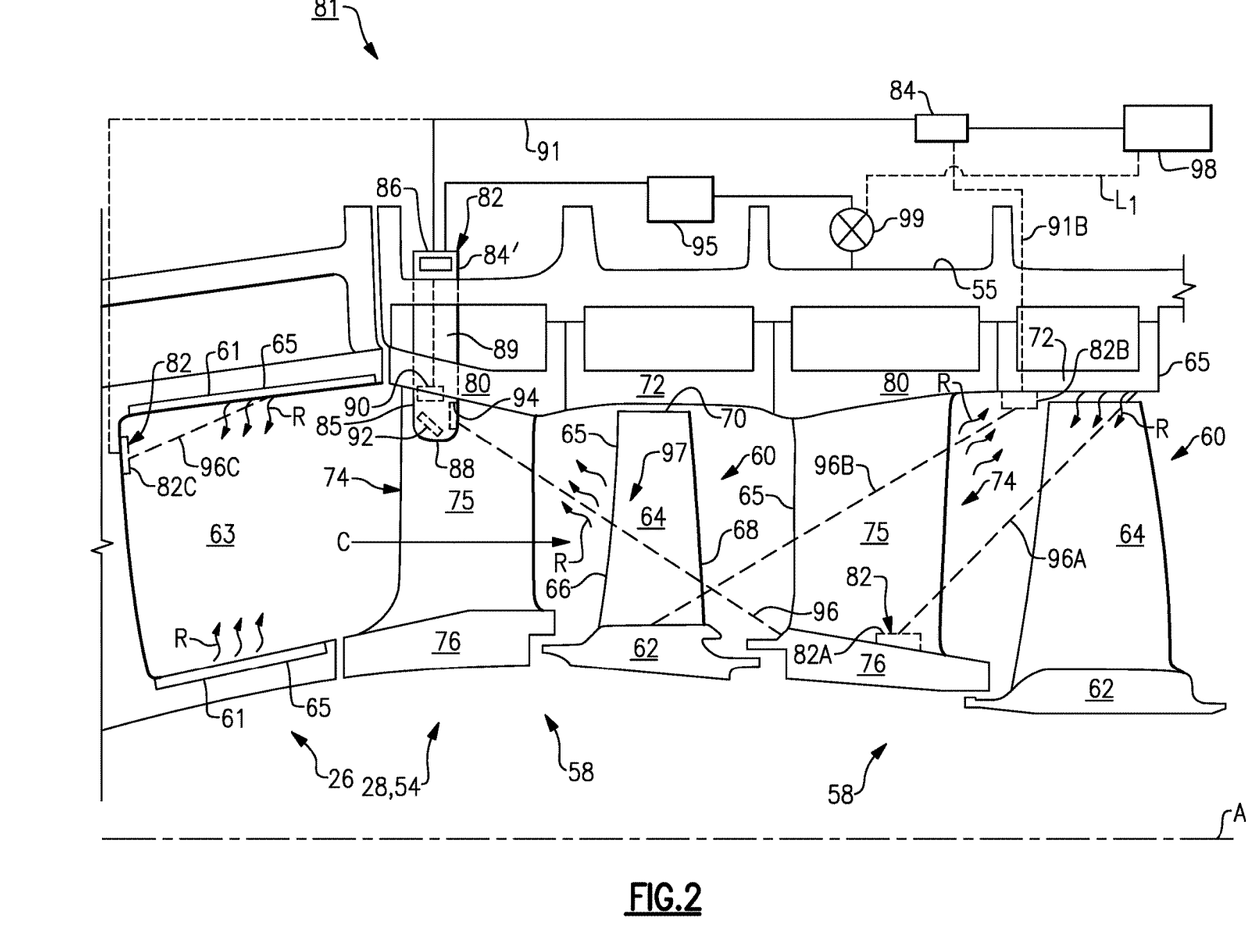
FIG. 2 illustrates a schematic view of a turbine section including a heat flux measurement system, according to an embodiment.

FIG. 2 illustrates a schematic view of a combustor section 26 and a turbine section 28. In this disclosure, like reference numerals designate like elements where appropriate and reference numerals with the addition of one-hundred or multiples thereof designate modified elements that are understood to incorporate the same features and benefits of the corresponding original elements. The combustor section 26 includes a liner, such as one or more combustor panels 61 arranged circumferentially about the engine axis A, to bound combustion chamber 63.

The turbine section 28 includes one or more stages 58 along the engine axis A. Each of the stages 58 includes a plurality of rotor blades 60 and a plurality of turbine or stator vanes 74 arranged circumferentially about the engine axis A. Each of the rotor blades 60 includes a root 62 and a rotor airfoil 64 extending radially outward from the root 62. The rotor airfoil 64 extends between a leading edge 66 and a trailing edge 68 and terminates at a tip 70. Each tip 70 is spaced a distance from a plurality of blade outer air seals (BOAS) 72 arranged circumferentially about the engine axis A. Each stator vane 74 includes a vane airfoil 75 extending radially between an inner platform 76 and an outer platform 80. The root 62, platforms 76, 80 and BOAS 72 define an inner and outer radial flow path boundary for core flow path C.

The engine 20 includes a heat flux measurement system 81 operable to monitor a condition of one or more engine components 65 via heat flux measurements. The heat flux measurement system 81 is located in the high pressure turbine 54 and combustor section 26. In other embodiments, the heat flux measurement system 81 is located in low pressure turbine 46. Although the engine components 65 described herein primarily relate to rotor blades 60 in the turbine section 28, the teachings herein can benefit other engine components such as stator vanes 74, BOAS 72, and combustor panels 61. Other sections of the gas turbine engine 20 and other systems, such as ground-based power generation systems, can benefit from the embodiments disclosed herein which are not limited to the design shown.

The heat flux measurement system 81 may be utilized for engine diagnostics, prognostics, or performance tuning during operation of engine 20. Performance tuning can include cooling flow modulation and power output characteristics of engine 20, for example. The heat flux measurement system 81 may also be utilized during engine or component instrumentation and rig testing, or manufacturing and inspection for coating fabrication quality control by measuring variation in coating thickness or composition, and may be utilized with various simulated heat sources corresponding to desired or expected operating conditions of the components.

In the illustrated embodiment of FIG. 2, the heat flux measurement system 81 includes one or more probes 82 situated adjacent to the core flow path C. Each probe 82 is configured to receive radiation R emitted from one or more engine components 65. The radiation R may originate from the hot combustion gases in the core flow path C or another radiation source. Suitable probes can include one or more reflective mirrors, optical chains, or fiber optics, for example. Each probe 82 is configured to carry, direct, or otherwise communicate radiation R emitted from the engine components 65 to one or more sensors 84 operatively coupled to the probe 82. In alternative embodiments, one or more sensors 84 are situated relative to the core flow path C to directly receive radiation R emitted from the engine component(s) 65.

Each probe 82 can include a housing 85 (one shown for illustrative purposes) extending between a distal end 86 and a proximal end 88. A coating can be applied to external surfaces of the housing 85 to minimize thermal distress due to exposure from the hot combustion gases flowing within the core flow path C. The distal end 86 can extend radially outward through a turbine case 55, and the proximal end 88 can extend radially inward from one of the outer platforms 80 such that the probe 82 is positioned at the outer radial flow path boundary for the core flow path C. Probe 82 is positioned a distance from the rotor blades 60 such that radiation R emitted from the rotor blades 60 travels a distance to the probe 82. Each stage 58 of the turbine section 28 can include a probe 82. Other positions of probe 82 (depicted in dashed lines) can include the inner radial flow path boundary for the core flow path C, such as probe 82A adjacent to inner platform 76, probe 82B adjacent to BOAS 72, and probe 82C adjacent to combustor panel 61, for example.

Probe 82 can include a receiving lens 90 and a mirror 92 located within an inner cavity 89 of the housing 85. The housing 85 defines an opening 94 at the proximal end 88 for defining a field-of-view of the receiving lens 90. The mirror 92 is oriented in a desired direction to define a line-of-sight 96 between the probe 82 and a localized region 97 of one or more engine component(s) 65, such as surfaces of one or more of the rotor blades 60. For purposes of this disclosure, the term localized region means a single point or surface area. The lens 90 focuses radiation into a fiber optic line 91, and the mirror 92 is configured to reflect radiation R projecting along the line-of-sight 96 at a different orientation into the lens 90. The heat flux measurement system 81 can include a probe in which fiber optic line is configured to directly receive radiation R from a desired engine component 65, illustrated by probe 82B and fiber optic line 91B.

Probe 82 can be configured to receive coolant from a cooling source 95 to cool components within the inner cavity 89, including sensor 84'. Example cooling sources can include bleed air from a stage of compressor section 24, airflow from bypass flow path B, or a dedicated cooling source.

Each sensor 84 is configured to detect radiation R emitted from one or more engine components 65, such as rotor blades 60. Each sensor 84 can be mounted external to probe 82, which may reduce cooling requirements due to exposure of the sensor 84 to the hot combustion gases. In other embodiments, sensor 84' (shown in dashed lines) is located within the housing 85 of the probe 82.

Suitable sensors can include pyrometers and infrared sensors, for example, which may be operable to detect radiation at one or more electromagnetic radiation frequencies, or range of frequencies, relating to the engine component(s) 65. In the illustrated embodiment, sensor 84 is an infrared sensor configured to detect a desired wavelength or range of wavelengths in response to rotation of at least one of the rotor airfoils 64 into or through the line-of-sight 96 or field-of-view of the corresponding probe 82. The field-of-view may encompass portions of one or more components 65, or each portion of the components 65 present in the field-of-view.

The wavelength or a range of wavelengths can be within at least one of short-wavelength, mid-wavelength and long-wavelength infrared radiation frequency ranges. For the purposes of this disclosure, the term short-wavelength infrared radiation (SWIR) means 1.0 to less than 3.0 microns, the term mid-wavelength infrared radiation (MWIR) means 3.0 to 8.0 microns, and the term long-wavelength infrared radiation (LWIR) means greater than 8.0 to 20.0 microns. In further embodiments, sensor 84 is configured to receive radiation within a first frequency or range of frequencies, and is configured to reject or filter radiation at a second, different frequency or range of frequencies such as from another radiation source.

Figure 3:
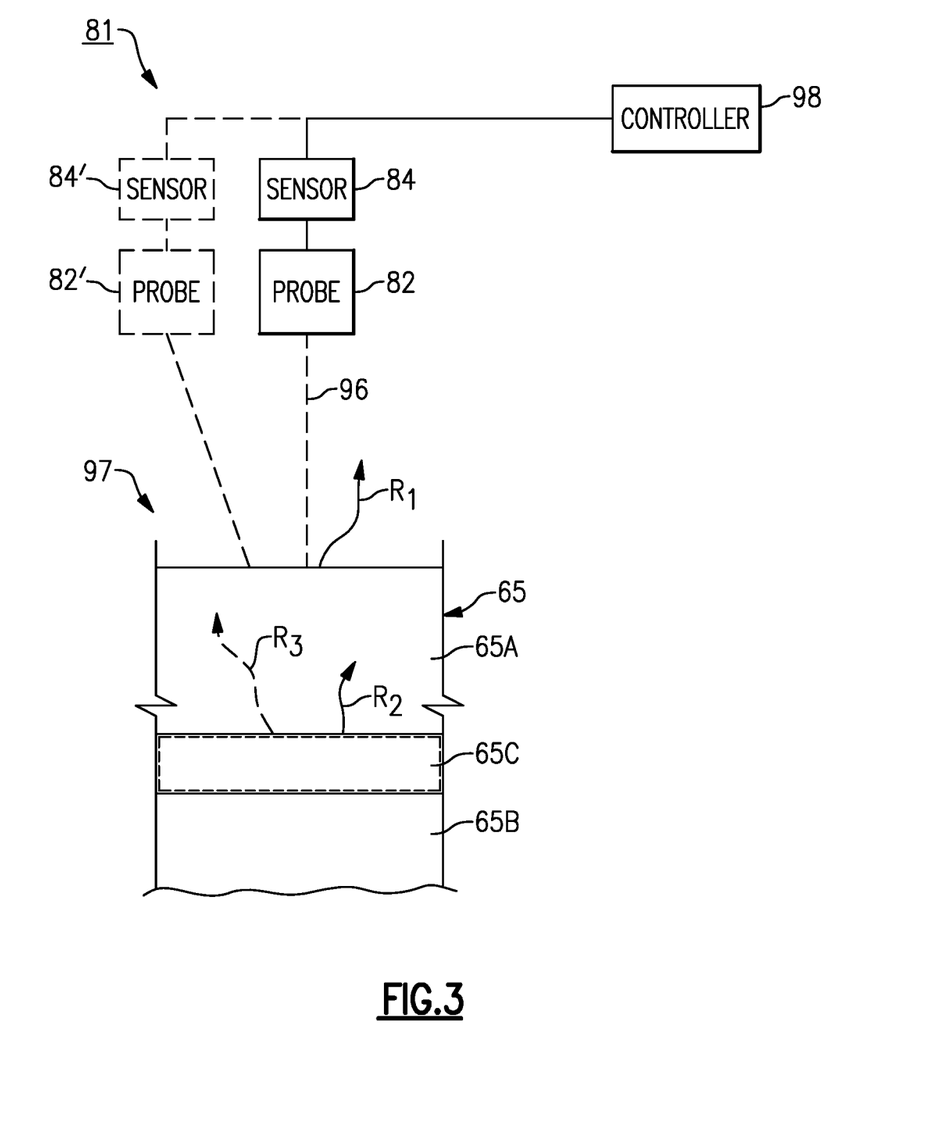
FIG. 3 illustrates a heat flux measurement system and selected portions of an engine component, according to an embodiment.

Referring to FIG. 3 with continued reference to FIG. 2, the heat flux measurement system 81 is shown situated adjacent to portions of a component 65. The component 65 includes a coating 65A deposited on a substrate 65B. The substrate 65B may be a surface of rotor airfoil 64 and made of metallic material, such as a nickel-based alloy, for example. In some embodiments, at least one intermediate layer 65C (shown in dashed line) is disposed between coating 65A and substrate 65B, such as a bond layer to adhere coating 65A to surfaces of substrate 65B.

The coating 65A can be a thermal barrier coating (TBC) configured to maintain a desired temperature gradient across a thickness of the TBC to reduce temperature exposure of substrate 65B from the hot combustion gases in the core flow path C. Suitable TBCs can include ceramics such as yttria-stabilized zirconia or oxides of rare earth metals, for example. At a particular temperature corresponding to the material characteristics of the TBC, such as above about 350 degrees Celsius, the TBC may be transparent to MWIR and relatively shorter wavelengths, while being substantially opaque or having an emissivity of approximately 1.0 for LWIR and relatively larger temperatures. At the same temperature, the substrate 65B may be substantially opaque to MWIR and relatively shorter wavelengths such that the corresponding radiation is emitted from a surface of the substrate 65B.

The heat flux measurement system 81 includes a controller 98 coupled to each sensor 84. The controller 98 is operable to determine or calculate one or more instantaneous values of heat flux relating to at least one localized region 97 of the component 65, or multiple instantaneous values of heat flux over a desired period of time or set of locations. Controller 98 may include one or more computing devices, each having one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the algorithms corresponding to the various functions of this disclosure. In alternative embodiments, the controller 98 is an analog or electromechanical device configured to provide the disclosed functions of this disclosure. Controller 98 may interface with, or be integrated into, an engine controller or aircraft system.

Sensor 84, via probe 82, is configured to detect radiation emitted from the localized region 97 of coating 65A at a first wavelength $R_1$, and is configured to detect radiation emitted from substrate 65B (or intermediate layer 65C) corresponding to the localized region 97 at a second, different wavelength $R_2$.

In the illustrated embodiment of FIG. 3, sensor 84 is a multi-band device, such as dual-band infrared camera, configured to generate a first signal in response to detecting the first wavelength $R_1$ and configured to generate a second signal in response to detecting the second wavelength $R_2$. Each signal may correspond to values assigned to pixels in a two dimensional infrared image, for example. Sensor 84 is operable to communicate the signals to controller 98.

Controller 98 is configured to determine or calculate one or more instantaneous values of heat flux at the localized region(s) 97. In the illustrated embodiment, controller 98 is programmed to calculate heat flux utilizing the following equation, sometimes referred to as Fourier's law:

Heat Flux $(Q) = (k*dT/dX)$     Equation 1:

where (Q) is heat flux across the surface of the component, (k) is a thermal conductivity of the coating 65A, (dX) is a thickness of coating 65A, and (dT) is a difference in temperatures corresponding to the first wavelength $R_1$ and the second wavelength $R_2$. The values of conductivity (k) and thickness (dT) may be given or otherwise programmed in the controller 98 during assembly, configuration or start-up. In the illustrated embodiment, wavelength $R_1$ corresponds to the LWIR frequency range, and wavelength $R_2$ corresponds to the MWIR or SWIR frequency range. In some embodiments, wavelength $R_1$ is greater than about 8 microns, or more narrowly equal to or less than about 20 microns, and wavelength $R_2$ is between about 3 microns and about 5 microns. In other embodiments, wavelength $R_2$ is between about 5 microns and about 8 microns. In embodiments, wavelengths $R_1$ and/or $R_2$ are a range of wavelengths within any of the frequency ranges disclosed herein. For the purposes of this disclosure, the term about means±3 percent unless otherwise stated.

In some embodiments, the controller 98 is configured to determine heat flux over a period of time relating to one or more localized regions 97. In further embodiments, the controller 98 is configured to determine a gradient between the heat flux values over time, and compare the gradient to a predetermined range or threshold. In embodiments, the controller 98 is operable to access data representing expected heat-flux values corresponding to localized region(s) 97 of the component(s) 65. The expected values may represent a predetermined criterion in the form of a predetermined range or threshold. The expected heat-flux values may be based upon various characteristics of the component 65 or operating environment, such as a geometry of the component 65, a thickness of the coating 65A, material and durability characteristics of the coating 65A and/or substrate 65B, and expected cooling characteristics of the component 65 for a corresponding operating condition, for example.

In embodiments, the controller 98 is configured to determine heat flux for two or more localized regions 97 of the engine component 65, such as locations between leading and trailing edges 66, 68 of rotor airfoil 64 during rotation of the airfoil 64 about the engine axis A. In further embodiments, the controller 98 is configured to determine a spatial gradient of the heat flux over the two or more localized regions 97. Utilizing these techniques, the controller 98 may determine potential degradation in system or component integrity or performance, such as degradation of coating 65A due to wear or spallation, or obstruction or blockage of cooling flow into or through the component 65 or cooling scheme, for example.

In some embodiments, the controller 98 is configured to determine changes in heat flux over a desired time period. For example, the controller 98 may calculate heat flux at a first cycle, such as during engine startup or production calibration, and then compare changes (dT) in temperatures between the first wavelength $R_1$ and the second wavelength $R_2$ over several engine cycles. The controller 98 is configured to identify relatively sharp gradients or changes between the temperature values over time. In an embodiment, the controller 98 is configured to detect in-plane gradients from two-dimensional infrared images captured by sensor(s) 84. Utilizing these techniques, the controller 98 can determine changes in a thickness of the coating 65A, can provide crack detection, and other forms of degradation for prognostics/diagnostics purposes, for example.

In embodiments, the heat flux measurement system 81 includes sensor 84' configured to detect radiation emitted from substrate 65B at a third, different wavelength $R_3$. Sensor 84' is configured to generate a third signal in response to detecting the third wavelength $R_3$, which is communicated to controller 98. Wavelength $R_3$ may be a range of wavelengths within any of the frequency ranges disclosed herein. Wavelength $R_1$ may correspond to the LWIR frequency range, wavelength $R_2$ may correspond to a lesser frequency than wavelength $R_1$, such as a frequency in the MWIR frequency range, and wavelength $R_3$ may correspond to a lesser frequency than wavelength $R_1$ and/or $R_2$, such as a wavelength in the SWIR frequency range, for example. In some embodiments, controller 98 is configured to calculate a first heat flux value based upon a comparison of temperatures corresponding to the first and second wavelengths $R_1$, $R_2$, and is configured to calculate a second heat flux value based upon a comparison of temperatures corresponding to the first and third wavelengths $R_1$, $R_3$. The controller 98 can compare the first and second heat flux values to validate the first heat flux value at the localized region 97, for example.

The controller 98 can be configured to determine a location of the localized region 97 relative to the engine component 65 or another reference, such as engine axis A, based upon the third wavelength $R_3$. The third wavelength $R_3$ may be selected within the SWIR or visual wavelength frequency ranges, for example. The location of the localized region 97 may correspond to a pixel location within an infrared image captured by one of sensors 84, 84', for example. Utilizing these techniques, positional accuracy of the corresponding heat flux measurements can be improved to locate or identify particular areas of interest.

In embodiments, controller 98 is operable to cause at least one operating condition of the engine 20 to vary in response to the heat flux meeting at least one predetermined or calculated criterion, such as one or more instantaneous values of the heat flux, or a derivative thereof, being above or below a predetermined threshold. For the purposes of this disclosure, the term instantaneous means a single set of measurements required to calculate a single heat flux value, which may be taken during a single clock single of the sensor(s) 84 or controller 98.

In some embodiments, the controller 98 is configured to send an alert to another system of the gas turbine engine 20 or an aircraft system in instances where an absolute value of the heat flux, or a derivative thereof, meets at least one predetermined criterion or limit. This technique may provide an early warning to the aircraft operator, or may be used for prognostics and diagnostics to assist logisticians and maintenance personnel. For example, the measurement system 81 may indicate to maintenance personnel that an unscheduled maintenance event should occur. In some embodiments, the controller 98 causes the engine 20 or aircraft to change scheduling in response to the alert, such as causing a change in a maximum rate of climb, a maximum thrust of the engine 20, or another condition of the engine 20 or aircraft, based upon the heat flux measurements.

In the illustrated embodiment of FIG. 2, at least one valve 99 is coupled to the cooling source 95 and is operable to modulate cooling airflow between the cooling source 95 and portions of the engine 20, such as one or more of the engine components 65 (the various cooling flow paths between and within the components 65 and cooling source 95 not shown). The controller 98 is coupled to the valve 99 via a control line $L_1$. The controller 98 is operable to cause the valve 99 to vary the cooling flow between the cooling source 95 and the component 65 in response to the heat flux meeting at least one predetermined criterion. For example, the controller 98 may cause the cooling source 95 to provide additional cooling airflow to the desired component 65 when a value of the heat flux measurement relates to excessive heat exposure. This may occur due to an internal blockage of the cooling flow path, for example. The controller 98 may cause the cooling source 95 to reduce cooling airfoil when the value of the heat flux relates is less than a predetermined threshold to reduce cooling supply output and improve efficiency.

Figure 4:
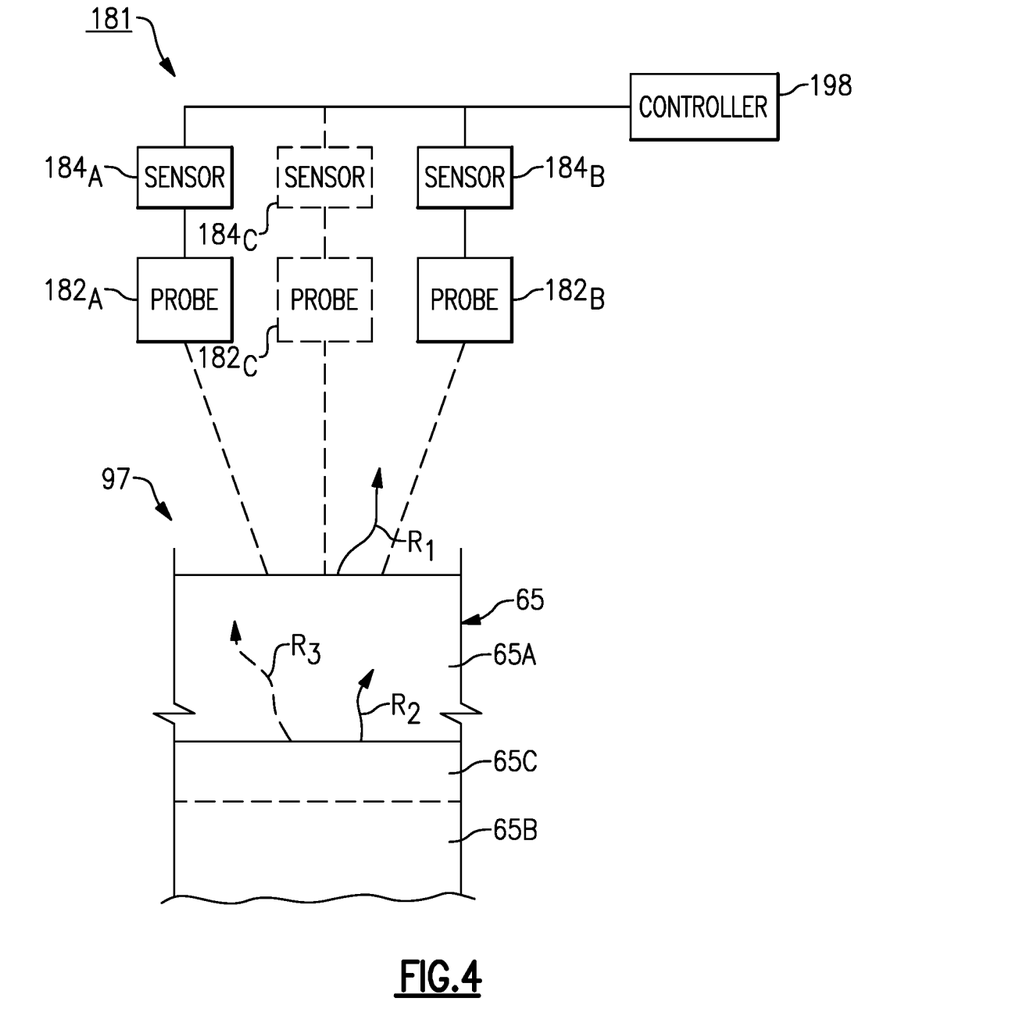
FIG. 4 illustrates a heat flux measurement system and selected portions of an engine component according to a second embodiment.

FIG. 4 illustrates a heat flux measurement system 181 according to a second embodiment. Sensors 184A/184B are single bandwidth sensors each configured to detect radiation at a single wavelength or range of wavelengths, such as at first and second wavelengths $R_1$, $R_2$, respectively. The heat flux measurement system 181 can include a single bandwidth sensor 184C configured to detect radiation at third wavelength $R_3$. Sensors 184A/184B/184C can be situated at different radial, axial and/or circumferential directions relative to the component(s) 65 or engine axis A, for example. The controller 198 is coupled to each sensor 184A/184B/184C and is configured to determine heat flux and related information utilizing any of the techniques discussed herein.

Figure 5:
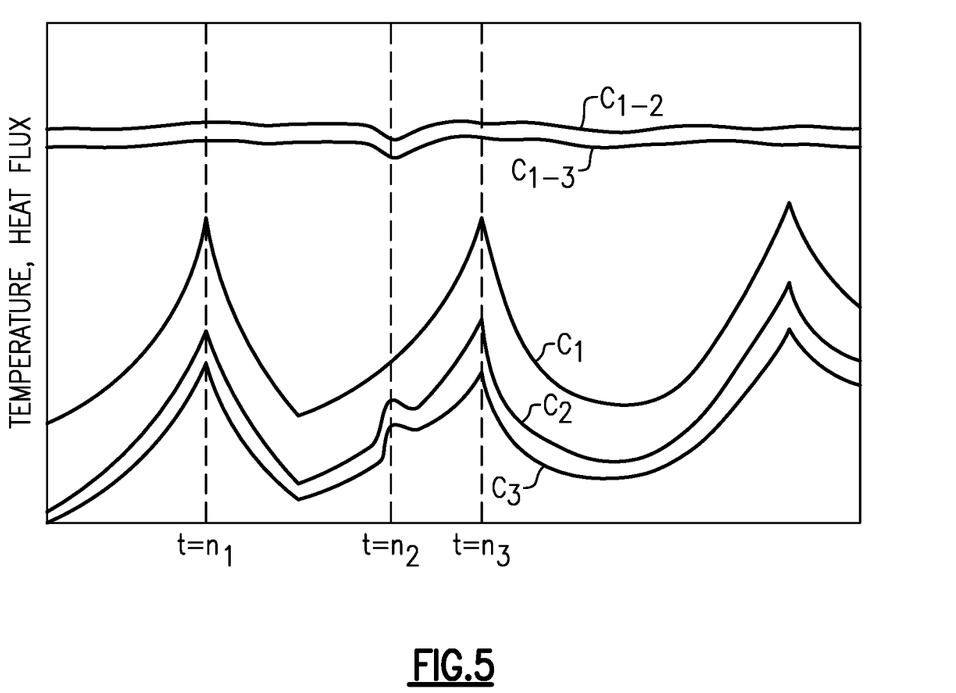
FIG. 5 illustrates an example temperature and heat flux plot, according to an embodiment.

FIG. 5 illustrates an example temperature and heat flux plot versus time. The controller 98/198 determines the temperature of the coating 65A corresponding to the first wavelength $R_1$ and determines the temperature of the substrate 65B corresponding to the second wavelength $R_2$ over a period of time, plotted as curves $C_1$ and $C_2$, respectively. The controller 98/198 is configured to calculate or otherwise determine a heat flux of the corresponding components 65, plotted as curve $C_{1-2}$. In some embodiments, the controller 98/198 determines the temperature of the substrate 65B of each component 65 corresponding to the third wavelength $R_3$ over a period of time, plotted as curve $C_3$. The controller 98/198 can be configured to calculate or otherwise determine heat flux values of the corresponding components 65, plotted as curve $C_{1-3}$, which the controller 98/198 can utilize to validate the heat flux depicted by curve $C_{1-2}$, for example. In the illustrated plot, curves $C_1$, $C_2$, and $C_3$ may correspond to leading edges 66 of adjacent airfoils 64 passing through the field-of-view of probe(s) 98 at time $n_1$ and at time $n_3$. At time $n_2$, deviation in the heat flux curves $C_{1-2}$, $C_{1-3}$ may meet at least one predetermined criterion, which may indicate a potential issue with the corresponding rotor airfoil 64 at the localized region 97 (FIGS. 3 and 4).

Although the discussed embodiments illustrate a specific component, examples or embodiments of this disclosure are not limited to those particular combinations. One of skill in the art having the benefit of this disclosure will recognize that it is possible to use some of the components or features from one of the embodiments in combination with features or components from another one of the embodiments. Furthermore, various embodiments may include one or more alternative sub-embodiments within them, while other embodiments may include a different subset of embodiments.

It should be understood that relative positional terms such as "forward," "aft", "upper", "lower", "above", "below", and the like are with reference to the normal operational attitude of the vehicle and should not be considered otherwise limiting.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A turbine section comprising:
a component including a coating on a substrate;
at least one sensor positioned a distance from the component, the at least one sensor configured to detect radiation emitted from at least one localized region of the coating at a first wavelength and configured to detect radiation emitted from the substrate corresponding to the at least one localized region at a second, different wavelength;
wherein the first wavelength and the second wavelength are utilized to determine a heat flux relating to the at least one localized region;
a controller electrically coupled to the at least one sensor, the controller configured to determine an instantaneous value of the heat flux based upon a comparison of the first wavelength and the second wavelength; and
wherein the at least one localized region includes a first localized region and a second, different localized region, and the controller is configured to determine a spatial gradient based upon the instantaneous value of the heat flux at the first localized region and an instantaneous value of heat flux at the second localized region.

2. The turbine section as recited in claim 1, wherein:
the at least one sensor is configured to detect radiation emitted from the at least one localized region at a third wavelength different from the first wavelength and the second wavelength; and
the controller is configured to determine a location of the at least one localized region relative to the component based upon the third wavelength.

3. The turbine section as recited in claim 1, wherein the at least one sensor is at least one infrared sensor configured to detect the first wavelength in a first electromagnetic radiation frequency range that is greater than 8 microns, and is configured to detect the second wavelength in a second electromagnetic radiation frequency range that is less than or equal to 8 microns.

4. The turbine section as recited in claim 3, wherein the at least one infrared sensor is a first infrared sensor and a second infrared sensor, the first infrared sensor configured to detect the first wavelength, and the second infrared sensor configured to detect the second wavelength.

5. The turbine section as recited in claim 3, wherein the first electromagnetic radiation frequency range is greater than or equal to 1.0 microns.

6. The turbine section as recited in claim 3, wherein the first electromagnetic radiation frequency range is greater than or equal to 5 microns.

7. The turbine section as recited in claim 1, wherein the component is one of a turbine blade, a turbine vane, and a blade outer air seal (BOAS).

8. The turbine section as recited in claim 1, wherein the coating is a thermal barrier coating, the thermal barrier coating being substantially opaque to the first wavelength at an operating condition of the turbine section and being substantially transparent to the second wavelength at the operating condition.

9. The turbine section as recited in claim 1, wherein the component is a blade outer air seal (BOAS).

10. A gas turbine engine comprising:
a combustor section including a plurality of combustor panels arranged circumferentially about an engine axis to define a combustion chamber;
a turbine section including a plurality of turbine blades and a plurality of stator vanes arranged circumferentially about the engine axis, the plurality of turbine blades adjacent to a plurality of blade outer air seals;
a heat flux measurement system comprising:
at least one sensor positioned a distance from at least one component, the at least one component including a coating on a substrate, the at least one sensor configured to detect radiation emitted from at least one localized region of the coating at a first wavelength and configured to detect radiation emitted from the substrate corresponding to the at least one localized region at a second, different wavelength;
wherein the first wavelength and the second wavelength are utilized to determine a heat flux relating to the at least one localized region;
wherein the at least one component is at least one of the plurality of combustor panels, the plurality of turbine blades, the plurality of stator vanes, and the plurality of blade outer air seals;
a controller electrically coupled to the at least one sensor, the controller configured to determine the heat flux based upon a comparison of the first wavelength and the second wavelength; and
wherein the at least one localized region includes a first localized region and a second, different localized region, and the controller is configured to determine a spatial gradient based upon the instantaneous value of the heat flux at the first localized region and an instantaneous value of heat flux at the second localized region.

11. The gas turbine engine as recited in claim 10, wherein the at least on component is coupled to a cooling source, and the controller is configured to cause cooling airflow between the cooling source and the at least one component to vary in response to the heat flux meeting at least one predetermined criterion.

12. The gas turbine engine as recited in claim 11, wherein the controller is coupled to a valve, the valve being operable to vary cooling airflow between the cooling source and the at least one component in response to the heat flux meeting the at least one predetermined criterion.

13. The gas turbine engine as recited in claim 12, wherein the at least one sensor is at least one infrared sensor configured to detect the first wavelength in a first electromagnetic radiation frequency range that is greater than 8 microns, and is configured to detect the second wavelength in a second electromagnetic radiation frequency range that between 3 microns and 8 microns.

14. The gas turbine engine as recited in claim 10, wherein the controller is configured to cause a schedule of the engine to vary in response to the heat flux meeting at least one predetermined criterion.

15. The gas turbine engine as recited in claim 10, wherein the at least one sensor is at least one infrared sensor configured to detect the first wavelength in a first electromagnetic radiation frequency range that is greater than 8 microns, and is configured to detect the second wavelength in a second electromagnetic radiation frequency range that is between 3 microns and 8 microns.

16. The gas turbine engine as recited in claim 10, wherein the at least one component is the plurality of combustor panels.

17. The gas turbine engine as recited in claim 10, wherein the at least one component is the plurality of blade outer air seals.

\* \* \* \* \*